US012561977B2

(12) United States Patent
Martin

(10) Patent No.: US 12,561,977 B2
(45) Date of Patent: Feb. 24, 2026

(54) COMPRESSION METHOD FOR EVENTS PRODUCED BY AN EVENT-BASED CAMERA

(71) Applicant: PROPHESEE, Paris (FR)

(72) Inventor: Nicolas Martin, Artigues près Bordeaux (FR)

(73) Assignee: PROPHESEE, Paris (FR)

( * ) Notice: Subject to any disclaimer, the term of this patent is extended or adjusted under 35 U.S.C. 154(b) by 363 days.

(21) Appl. No.: 18/457,536

(22) Filed: Aug. 29, 2023

(65) Prior Publication Data

US 2025/0078508 A1 Mar. 6, 2025

(51) Int. Cl.
| | |
|---|---|
| *G06V 20/40* | (2022.01) |
| *G06V 20/52* | (2022.01) |
| *H04N 1/32* | (2006.01) |
| *H04N 25/47* | (2023.01) |
| *H04N 101/00* | (2006.01) |

(52) U.S. Cl.
CPC .............. *G06V 20/44* (2022.01); *G06V 20/52* (2022.01); *H04N 1/32128* (2013.01); *H04N 25/47* (2023.01); *H04N 2101/00* (2013.01); *H04N 2201/3283* (2013.01)

(58) Field of Classification Search
CPC ........ G06V 20/44; G06V 20/52; H04N 25/47; H04N 1/32128; H04N 25/702; H04N 25/703
See application file for complete search history.

(56) References Cited

U.S. PATENT DOCUMENTS 12,063,444 B1 * 8/2024 Schon .................... H04N 25/77

* cited by examiner

*Primary Examiner* — Joseph J Lauture

(57) ABSTRACT

A method produces a compressed sequence of events stored in a memory, originating from an event-based camera, the sequence comprising a first run-length code representing timestamps of the sequence of events; and subsequent compressed codes including one of: (i) a second run-length code representing first coordinates of the sequence of events, at least one dictionary code representing second coordinates of the sequence of events, and data representing polarities of the sequence of events; (ii) a second run-length code representing first coordinates of the sequence of events, a number of bit-packed fields, each representing a second coordinate and polarity pair of the sequence of events; or (iii) a number of bit-packed fields, each representing a first and second coordinate and polarity triplet of the sequence of events.

8 Claims, 1 Drawing Sheet

| dt:2 c:3 | y:210 c:3 | x:312 m:11000 | x:316 m:10000 | p:0 c:2 | p:1 c:1 |
|---|---|---|---|---|---|

| t:13580 | y:210 | x:312 | p:0 | t:13580 | y:210 | x:313 | p:0 | t:13580 | y:210 | x:318 | p:1 |
|---|---|---|---|---|---|---|---|---|---|---|---|
Fig. 1
(prior art)
| t:13580 | t:13580 | t:13580 | y:210 | y:210 | y:210 | x:312 | x:313 | x:318 | p:0 | p:0 | p:1 |
|---|---|---|---|---|---|---|---|---|---|---|---|
Fig. 2
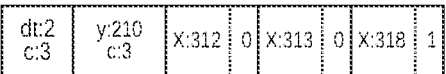
| dt:2 c:3 | y:210 c:3 | x:312 m:11000 | x:318 m:10000 | p:0 c:2 | p:1 c:1 |
|---|---|---|---|---|---|
Fig. 3A
| dt:2 c:3 | y:210 c:3 | X:312 | 0 | X:313 | 0 | X:318 | 1 |
|---|---|---|---|---|---|---|---|
Fig. 3B
| dt:2 c:3 | Y:210 | x:312 | 0 | Y:210 | x:313 | 0 | Y:210 | x:318 | 1 |
|---|---|---|---|---|---|---|---|---|---|
Fig. 3C

1

COMPRESSION METHOD FOR EVENTS PRODUCED BY AN EVENT-BASED CAMERA

FIELD

The present disclosure relates to event-based cameras and more particularly to the storage of event streams produced by such cameras.

BACKGROUND

Events produced by an event-based camera may require storage for archiving purposes. A straightforward storage format is the raw event stream format produced by the camera.

FIG. 1 illustrates a typical raw event stream format. The event stream encodes each event with, successively, a timestamp t, a y-coordinate (typically an imager array row position), an x-coordinate (typically the array's column position), and a polarity p.

The timestamps t, that capture the temporal resolution of the camera, often in the order of microseconds, require a relatively large number of bits, typically 8 bytes. The size of each of the x and y coordinates is typically 10 to 12 bits for commonly used arrays. The size of the polarity p is one bit ("ON" or "OFF").

Exemplary t, x, y and p values are provided in FIG. 1 for a succession of three events.

Event streams produced by event-based sensors are intrinsically more compact than video produced by a frame-based camera, since events are generated only for the parts of a viewed scene that change. However, events may be produced at a much faster rate than frames of a frame-based camera, which tends to mitigate the compactness of the event data.

In order to compress event data stored in files, the files may be compressed with conventional generic tools using Deflate compression, such as Zip and Gzip. The results may be satisfactory, but such tools require significant resources making them less adapted to low power environments.

SUMMARY

A compressed sequence of events stored in a memory, originating from an event-based camera, comprises a first run-length code representing timestamps of the sequence of events; and subsequent compressed codes including one of: (i) a second run-length code representing first coordinates of the sequence of events, at least one dictionary code representing second coordinates of the sequence of events, and data representing polarities of the sequence of events, (ii) a second run-length code representing first coordinates of the sequence of events, a number of bit-packed fields, each representing a second coordinate and polarity pair of the sequence of events, or (iii) a number of bit-packed fields, each representing a first and second coordinate and polarity triplet of the sequence of events.

BRIEF DESCRIPTION OF THE DRAWINGS

FIG. 1, previously described, illustrates an example of a conventional raw event stream format;

FIG. 2 illustrates the event stream of FIG. 1 after applying a preliminary step of an embodiment of a compression method; and

FIGS. 3A-3C illustrate compressed results of the event stream of FIG. 1 after applying alternative embodiments of a compression method.

DETAILED DESCRIPTION

Event stream compression methods described in the present disclosure are based on specificities of the structure of event streams and achieve results comparable to conventional file compression tools, while consuming significantly less resources.

A feature of an event stream is that the timestamp values often repeat many times. For instance, when an object moves across the camera's field of view, many pixels corresponding to the object, at least the object's borders, trigger events at the same time. Moreover, the timestamps being assigned only upon reading out the events from the sensor array, events that occur in the array at slightly different times between two readouts receive the same time timestamp.

When an object moves across the field of view, no matter the direction, multiple events often occur simultaneously in adjacent pixels of a same row. They will have the same timestamp and the same y-coordinate, while the x-coordinates will have incrementing values, because the events are transmitted in the order of increasing y-coordinates (rows) and then increasing x-coordinates (columns).

Based on these features, a first aspect is to apply run-length encoding to the timestamps and y-coordinates, i.e., replace the same timestamps and y-coordinates by a single run-length code that indicates the repeated value and the repetition count.

The x-coordinates may be dictionary encoded with an implicit codebook representing single increments. More specifically, a group of consecutive x-coordinates having incrementing values form a vector that is replaced by a single code that conveys a start value of the vector and a bitmask having one bit for each of the potential values of the vector. Each bit of the bitmask determines the presence of a corresponding value in the vector and a corresponding increment applied to the start value. The increments may typically be defined by a codebook assigned to the bitmask. The codebook may here be implicit by assuming the increments are the bit positions in the bitmask. For instance, the presence of a first value in the vector equal to the start value is identified by bit 0 being set in the bitmask, yielding a zero increment. The presence of a subsequent value in the vector may be identified by a bit i being set in the bitmask, yielding a value of (start value+i).

Such encoding applies to consecutive values of same type, so a prerequisite step is to transpose the events from the format of FIG. 1 into a sequence where the timestamps, y-coordinates, and x-coordinates are each contiguous.

FIG. 2 illustrates such a transposition, carried out on a buffer of N events, where N=3 for exemplary purposes. The transposed buffer includes, as shown, three timestamps t, followed by three y-coordinates, followed by three x-coordinates, finally followed by the remaining event data of the buffer, hence the three polarities p.

FIG. 3A illustrates compressed event data resulting, according to an embodiment, from applying run length encoding to the timestamps and the y-coordinates, and dictionary encoding or "vectorizing" to the x-coordinates, using the exemplary data of FIG. 2. The polarity data may also be run-length encoded, as shown.

The three equal timestamps are replaced by a run-length code (dt:2, c:3), where dt represents the repeated timestamp value and c the repetition count (3). The value dt is in fact a delta coding applied to the timestamp value 13580—it is assumed in this example that the timestamp value for the run-length code is two increments larger than the previous timestamp (13578). Delta-coding the timestamp values adds a significant compression factor, since the timestamp values may typically be 8 bytes wide, whereas the timestamps inevitably increase progressively, such that the differences between successive timestamps may be small and fit in 4 bits. With 4 bits for encoding the count, the run-length code for the timestamps may thus fit in one byte.

The three y-coordinates, which happen to be equal too, are replaced by a run-length code (y:210, c:3), where 210 is the absolute value of the y-coordinate and 3 the repetition count. The y values could also be delta-coded, but this happens to be less efficient in this case. The run-length code for the y-coordinates may include 11 bits for the repeating value and 5 bits for the count, and thus fit in two bytes.

The three x-coordinates, having exemplary values 312, 313, and 318, are replaced by two dictionary codes (x:312, m:11000) and (x:318, m:10000), where x is the start value and m the bitmask. The vector/bitmask size is 5 in this example. The first code represents the two consecutive values 312, 313, identified by the first two bits of the bitmask set to 1. The second vector value is the sum of start value (312) and the corresponding bitmask bit position (1). The third x-coordinate 318 is too far from the two previous x-coordinates to be represented in the same dictionary code, so it has its own dictionary code.

An exemplary size of a dictionary code may be 16 bits including 11 bits for the start value and 5 bits for the bitmask. Such a format may thus represent up to five values.

The run-length code for the polarities may include one bit for the polarity and 7 bits for the count, and thus fit in one byte. Even if the polarities use just one bit, their representation in memory or storage is generally byte-aligned, so each polarity occupies at least one byte in raw storage format. Thus, run-length encoding the polarities with 8-bit codes is at worst just as efficient as storing the polarities in raw format.

The compression approach disclosed in relation to FIG. 3A is particularly well suited to the case of a moving object triggering multiple adjacent pixels in each row because it has a blurry or oblique border overlapping several pixels in a row.

FIG. 3B illustrates compressed event data resulting, according to an embodiment, from applying run length encoding to the timestamps and the y-coordinates, and a bit-packing compression to the y-coordinates and the polarities, using the exemplary data of FIG. 2. This compression approach is better suited to a case where non-contiguous pixels in a same row are triggered simultaneously. Such a situation may occur when an object having multiple sharp near-vertical borders moves horizontally, each border triggering an isolated pixel in a row.

The timestamps and y-coordinates are run-length encoded as in FIG. 3A, whereas the x-coordinate and polarity pairs are bit-packed. For instance, the x-coordinates are coded using 11 bits, the polarities using 1 bit, and 4 pairs (so 48 bits) are packed together as three 16-bit words.

In order to decide between the alternatives of FIG. 3A (dictionary coding the x-coordinates) and FIG. 3B (bit-packing the x-coordinates with the polarities), the buffer may be scanned in a preliminary pass to evaluate an adjacency criterion of the x-coordinates. For instance, the alternative of FIG. 3A may be selected if a ratio of x-coordinates adjacent per rows to the number of events in a scanned portion of the buffer is above a threshold. An x-coordinate contributes to an adjacency count for the ratio when a currently analyzed event is adjacent a previous event in the same row of the scanned portion of the buffer. The threshold may be around 8% in a quarter of the buffer.

FIG. 3C illustrates compressed event data resulting, according to an embodiment, from applying run length encoding to the timestamps and a bit-packing compression to the x- and y-coordinates and the polarities, using the exemplary data of FIG. 2. This compression approach is better suited to a case where individual events tend to occur in different rows. Such a situation may occur when an object having one sharp near-vertical border moves horizontally, the border triggering one pixel at a time in a row.

The timestamps are run-length encoded as in FIG. 3A, whereas the x- and y-coordinates and polarity triplets are bit-packed. For instance, the y-coordinates are coded using 12 bits, the x-coordinates using 11 bits, the polarities using 1 bit, and 4 triplets (so 96 bits) are packed using three 32-bit words.

In order to decide between run-length encoding the y-coordinates (FIGS. 3A, 3B) and bit-packing the y-coordinates with the x-coordinates and polarities (FIG. 3C), the buffer may be scanned in a preliminary pass to evaluate a repetition criterion of the y-coordinates. For instance, run-length encoding the y-coordinates may be selected if a ratio of repeating y-coordinates to the number of events in a scanned portion of the buffer is above a threshold. The "repeating" y-coordinates need not all be equal—a y-coordinate contributes to a repeat count for the ratio when the y-coordinate of a currently analyzed event is found in at least one previous event of the scanned portion of the buffer. The threshold may be around 20% in a quarter of the buffer.

Each of the alternatives of FIGS. 3A-3B may be used independently to obtain satisfactory compression with reduced resource usage. An important contribution to the compression lies in the compression of the timestamps, which is implemented in all alternatives.

To improve the compression performance, all three alternatives may be combined in a compression tool and selected based on the repetition and adjacency criteria.

After defining a buffer of event data to compress, the repetition criterion is evaluated first on the buffer. If it is not met, the alternative of FIG. 3C is selected.

If the repetition criterion is met, the adjacency criterion is evaluated next. If the adjacency criterion is met, the alternative of FIG. 3A is selected.

If the adjacency criterion is not met, the alternative of FIG. 3B is selected.

The selected alternative may be identified for a decompression tool by inserting a corresponding metadata value preceding the compressed buffer in a compressed file including several compressed buffers.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for storing event data produced by an event-based camera, the method comprising the following steps:

5 transposing components of a group of successive events such that timestamps of the events are contiguous;

run-length encoding the timestamps; and applying compression to coordinate pairs and polarities of the events.

2. The method of claim 1, wherein the compression of the coordinate pairs and polarities includes, when a repetition criterion is met relative to first coordinates of the coordinate pairs:

transposing the components of the group such that first coordinates of the events are contiguous;

run-length encoding the first coordinates;

with second coordinates of the coordinate pairs and the polarities of the events, applying one of the following steps, depending on an adjacency criterion of the second coordinates:

i) reordering the group such that the second coordinates are contiguous and the polarities are contiguous, dictionary encoding the second coordinates, and run-length encoding the polarities, or ii) bit-packing the second coordinates and the polarities.

3. The method of claim 2, wherein, when the repetition criterion is not met, the compression of the coordinate pairs and polarities includes bit-packing the coordinate pairs and polarities.

4. The method of claim 2, wherein the dictionary encoding produces for a vector of second coordinates:

a start value representing a first value of the vector;

a bitmask, wherein each bit of the bitmask determines the presence of a corresponding value in the vector; and

an implicit codebook that assigns to each position of the bitmask a respective increment to apply to the start value to obtain the corresponding value.

5. The method of claim 2, wherein the repetition criterion is met when a ratio of equal first coordinates to the number of events in the group is above a threshold.

6. The method of claim 2, wherein the adjacency criterion is based on a number of second coordinates in the group being adjacent in rows.

7. The method of claim 1, wherein the timestamps are further delta encoded.

8. A compressed sequence of events stored in a memory, originating from an event-based camera, the compressed sequence of events comprising:

a first run-length code representing timestamps of the sequence of events; and subsequent compressed codes including one of:

a second run-length code representing first coordinates of the sequence of events, at least one dictionary code representing second coordinates of the sequence of events, and data representing polarities of the sequence of events;

a second run-length code representing first coordinates of the sequence of events, a number of bit-packed fields, each representing a second coordinate and polarity pair of the sequence of events; or a number of bit-packed fields, each representing a first and second coordinate and polarity triplet of the sequence of events.

* * * * *